(12) United States Patent
Minkkinen et al.

(10) Patent No.: US 7,703,271 B2
(45) Date of Patent: Apr. 27, 2010

(54) COGENERATION METHOD AND DEVICE USING A GAS TURBINE COMPRISING A POST-COMBUSTION CHAMBER

(75) Inventors: Ari Minkkinen, Saint Nom la Breteche (FR); Etienne Lebas, Vienne (FR); Alexandre Rojey, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 181 days.

(21) Appl. No.: 10/548,738

(22) PCT Filed: Mar. 11, 2004

(86) PCT No.: PCT/FR2004/000600

§ 371 (c)(1),
(2), (4) Date: Jun. 14, 2006

(87) PCT Pub. No.: WO2004/083729

PCT Pub. Date: Sep. 30, 2004

(65) Prior Publication Data

US 2006/0260321 A1    Nov. 23, 2006

(30) Foreign Application Priority Data

Mar. 13, 2003    (FR) .................................. 03 03141

(51) Int. Cl.
*F02C 1/06* (2006.01)
*F02C 6/00* (2006.01)

(52) U.S. Cl. ...................................... 60/39.17; 60/774

(58) Field of Classification Search .................. 60/783, 60/784, 780, 785, 39.12, 39.13, 39.15, 39.19, 60/39.17, 39.182, 39.183, 774, 791, 39.5; 237/12.1
See application file for complete search history.

(56) References Cited

U.S. PATENT DOCUMENTS

| 2,823,863 | A | * | 2/1958 | Moyes .......................... 237/2 R |
| 3,204,407 | A | * | 9/1965 | Karl-Heinz et al. ....... 60/39.182 |
| 4,578,944 | A | * | 4/1986 | Martens et al. ........... 60/39.182 |
| 5,181,376 | A | * | 1/1993 | Rao ............................. 60/775 |

(Continued)

FOREIGN PATENT DOCUMENTS

DE    34 13 241 A1    6/1985

(Continued)

*Primary Examiner*—Michael Cuff
*Assistant Examiner*—Gerald L Sung
(74) *Attorney, Agent, or Firm*—Antonelli, Terry, Stout & Kraus, LLP.

(57) ABSTRACT

A cogeneration method and device by turbine, particularly by gas turbine, uses a compression section, at least one expansion section, and a combustion chamber. A combustion agent including oxygen is compressed in the compression section; in the combustion chamber, one combustion step is carried out under pressure with a mixture of combustion agent compressed with a fuel; at least some of the hot gases obtained by pressurized combustion are used to effect an exchange with an external facility; and at least one postcombustion step is carried out of a mixture of hot gases coming from combustion with a fuel, prior to the exchange, and at least one other postcombustion step of a mixture of hot gases, coming from the exchange, with a fuel, in order to obtain hot gases that are sent to the expansion section.

9 Claims, 5 Drawing Sheets

U.S. PATENT DOCUMENTS

| | | | |
|---|---|---|---|
| 5,669,216 A * | 9/1997 | Ankersmit et al. | 60/778 |
| 5,896,738 A * | 4/1999 | Yang et al. | 60/775 |
| 6,155,039 A | 12/2000 | Agee et al. | |
| 6,463,741 B1 * | 10/2002 | Frutschi | 60/780 |
| 6,715,296 B2 * | 4/2004 | Bakran et al. | 60/778 |
| 6,775,971 B1 * | 8/2004 | Soland | 60/39.12 |

FOREIGN PATENT DOCUMENTS

DE      38 01 605 C1      5/1989

\* cited by examiner

COGENERATION METHOD AND DEVICE USING A GAS TURBINE COMPRISING A POST-COMBUSTION CHAMBER

BACKGROUND OF THE INVENTION

The present invention relates to a method and a device for cogenerating heat and work.

It relates in particular to a cogeneration method implemented by means of a turbine, particularly a gas turbine.

More specifically, the method consists of using the hot combustion gases generated by the gas turbine to exchange heat with an industrial facility to produce an endothermic reaction for example.

Prior cogeneration methods consisted of using the hot combustion gases leaving the turbine, which are generally at a pressure close to atmospheric pressure, to generate for example steam under pressure by heat exchange produced in an exchanger traversed by these hot gases and through which a fluid such as water flows. These systems can feed a steam distribution system that can supply various industrial facilities such as the heating of distillation column reboilers.

The drawback of such a method is that the temperature of the hot gases is insufficient to heat industrial facilities operating at relatively high temperatures, for example greater than 500° C.

Moreover, direct utilization of the hot gases leaving the gas turbine is difficult since the pressure loss at the outlet of the gas turbine must remain very low, since these gases are leaving at a pressure close to atmospheric pressure and any pressure loss, even a relatively small loss, greatly interferes with gas turbine performance.

The proposal has also been made of using such hot combustion gases, as better described for example in French Patent Application No. 2,825,995 or in French Patent Application No. 2,675,498 by the applicant, to ensure reforming of a gas feedstock, but the drawback is that when the hot gases are sent to the turbine after heat exchange, they have given off heat and are substantially cooled. This being the case, the mechanical power produced by the turbine is significantly less. Moreover, the initial dimensions of the turbine and of the blades on an expansion turbine are not adapted to the new conditions under which the pressurized hot gases sent to it/them are admitted.

BRIEF SUMMARY OF THE INVENTION

Hence the present invention proposes to remedy the above drawbacks by a method and a device for keeping the power generated by the gas turbine substantially constant and obtaining a hot combustion gas temperature at the expansion turbine inlet that is substantially close to the initial inlet temperature in the absence of heat exchange.

For this purpose, the present invention relates to a cogeneration method by turbine, particularly by gas turbine, having a compression section, at least one expansion section, and a combustion chamber, wherein the following steps are carried out:

(a) a combustion agent including oxygen is compressed in the compression section;

(b) in the combustion chamber, a combustion step is carried out under pressure, with combustion of a mixture of compressed combustion agent and a fuel;

(c) at least some of the hot gases obtained by the pressurized combustion are used to effect an exchange with an external facility, characterized in that:

(d) at least one postcombustion step is carried out, with postcombustion of a mixture of hot gases coming from the exchange, with a fuel, in order to obtain hot gases that are sent to the expansion section, under temperature and pressure conditions close to the conditions prevailing in the absence of step (c).

A step comprising postcombustion of a mixture of hot gases coming from combustion with a fuel, prior to the exchange, can also be carried out.

The postcombustion step can be carried out by introducing a quantity of fuel that is adjusted to obtain a hot-gas temperature at the inlet of the expansion section that is substantially close to the initial inlet temperature in the absence of an exchange.

The postcombustion step can also be carried out by introducing a quantity of hot gases that is adjusted so as to obtain a hot-gas temperature at the inlet of the expansion section that is substantially close to the initial inlet temperature in the absence of an exchange.

A steam production operation or a feedstock reforming operation can be carried out by exchange with the external facility.

The invention also relates to a turbine cogeneration device, particularly a gas turbine, having a compression section, at least one expansion section, a combustion chamber, and an exchange means between the hot gases coming from combustion and a fluid to be heated, characterized in that the device has at least one postcombustion chamber supplied with the hot gases coming from the exchange means.

The device can include a postcombustion chamber supplying the exchange means with hot gases.

The device can also include a short-circuit pipe for adjusting the hot gas temperature at the outlet of the combustion chamber and/or of the postcombustion chamber.

It can also include a hot gas pipe directly connecting the combustion chamber to the exchange means.

The exchange means can include a heat exchanger and/or a reactor.

The device can include a first expansion section and a second expansion section, and a hot gas pipe connecting the first section to the second section.

BRIEF DESCRIPTION OF THE SEVERAL VIEWS OF DRAWINGS

The other advantages and features of the invention will emerge from reading the description below, provided solely for illustration and nonlimitatively, to which the following drawings are attached:

DETAILED DESCRIPTION OF THE INVENTION

Figure 1:
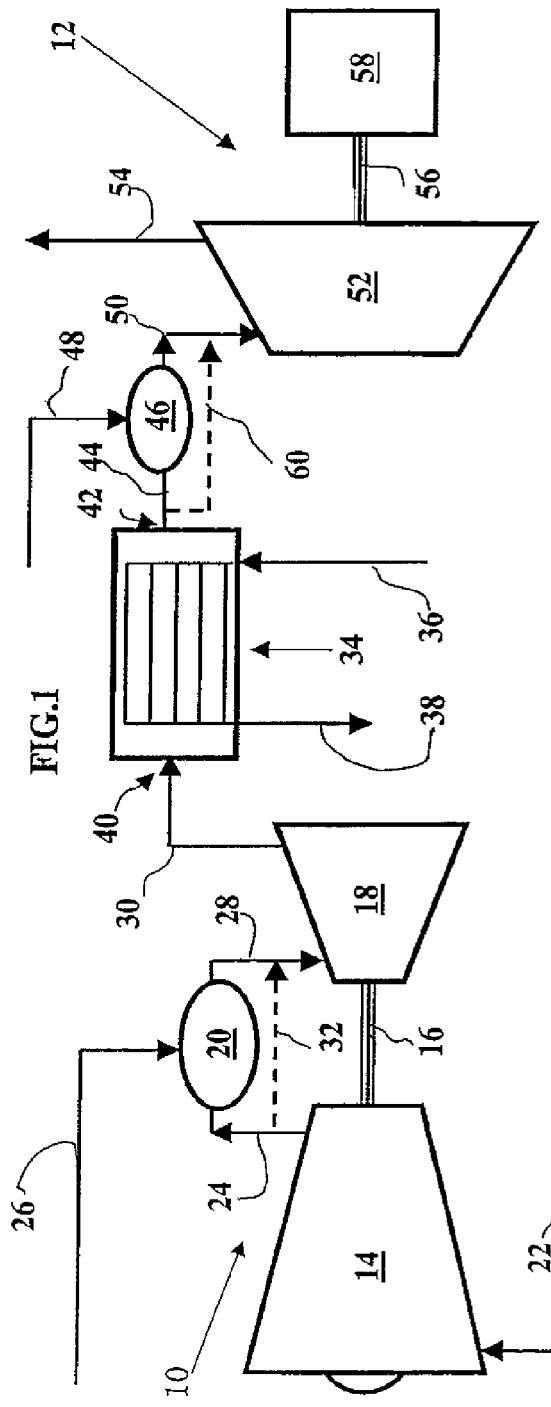
FIG. 1 is a configuration example of the device according to the invention.

The example in FIG. 1 shows a device with a particular type of gas turbine known as a double-shaft turbine.

In this configuration, the gas turbine has a compression-expansion cell 10 in which a first expansion step compresses the combustion air and an expansion cell 12 with a second expansion step for generating mechanical and/or electrical power.

The expansion-compression cell 10 includes a compressor 14 connected by a shaft 16 to a first expansion section with an expansion turbine 18 and a combustion chamber 20. A fluid containing oxygen, generally outside air, is admitted through a pipe 22 into the compressor 14 which it leaves in the compressed state through a pipe 24. The combustion chamber 20 is supplied with fuel, for example natural gas, through a pipe 26 and with a combustion agent which, in the present case, is wholly or partially compressed air carried by pipe 24. The hot gases coming from combustion of the fuel mixture with compressed air in combustion chamber 20 are fed by a pipe 28 into the expansion turbine 18 where they are expanded then evacuated through a pipe 30. In the example of FIG. 1, some of the compressed air leaving the compressor is sent to the combustion chamber 20 through pipe 24, with the remaining part being sent directly to the hot gas pipe 28 through a short-circuit pipe 32 the function of which will emerge from the description below.

The device also includes an exchange means, particularly a heat exchange means 34 such as a shell and tube exchanger traversed by a fluid to be heated which enters through inlet pipe 36 and leaves this exchanger through an outlet pipe 38. This exchanger has a inlet 40 for the hot combustion gases carried by pipe 30. These hot gases pass through exchanger 34 to transmit their calories to the fluid to be heated. Once the heat exchange is accomplished, the hot gases leave the exchanger through a discharge 42 connected by a pipe 44 to a postcombustion chamber 46 which is supplied with fuel by a pipe 48; this fuel can be the same as the fuel supplying combustion chamber 20. The postcombustion chamber 46 will hereinafter be called downstream postcombustion chamber because it is downstream from the exchange means 34 in the circulation direction of the hot gases coming from combustion chamber 20. The hot gases resulting from postcombustion of the mixture of fuel and hot combustion gases in pipe 44 are sent through a pipe 50 to a second expansion section with an expansion turbine 52 that includes expansion cell 12, which they leave, after expansion, through a pipe 54. This turbine is connected by a shaft 56 to any other means producing mechanical and/or electric power such as for example an alternator 58. As shown in FIG. 1, the hot gases leaving exchanger 34 are partly sent through pipe 44 to postcombustion chamber 46 while the remaining portion of these gases is sent directly to the hot postcombustion gas exhaust pipe 50 through a short-circuit pipe 60 the operation of which will appear from the description below.

The operation of the facility described above is as follows:

The air admitted through pipe 22 is compressed in compressor 14, and leaves it in the compressed state through pipe 24. Some of this compression air is sent to the combustion chamber 20 in which it is mixed with the fuel arriving through pipe 26. Combustion in this chamber produces hot combustion gases which, as they leave this combustion chamber 20, are mixed with the compressed air coming from the compressor, which has not been sent to the combustion chamber and which arrives through short-circuit pipe 32. The latter enables the temperature of the hot gases resulting from combustion to be adjusted to a level compatible with the temperature required at the inlet of the first expansion turbine 18, for example between 1000 and 1300° C.

The hot gases leaving turbine 18 through pipe 30 at a temperature of approximately 650° C. are then sent to exchanger 34 in which they are cooled by heating the external fluid, such as water, which enters the exchanger through pipe 36 and leaves it through pipe 38 in the desired state, for example in the form of steam. These hot gases are under pressure, for example a pressure of approximately 4 bars.

Under these conditions, it is generally possible to effect the heat exchange in an enclosure far smaller than the one that must be provided when the hot gases used come from the final expansion unit at a pressure as high as near-atmospheric pressure. In fact, for a given flowrate, the section to be occupied by the hot gases is approximately inversely proportional to the pressure. Since the acceptable pressure loss is far greater, the flowrate can be increased, so that the flow cross section can be reduced still further and the heat transfer coefficient can be increased.

When they leave exchanger 34, the hot gases are at a temperature substantially lower than their inlet temperature, with the temperature difference from inlet 40 being for example greater than 100° C. These hot gases are then sent to the downstream postcombustion chamber 46. Since the amount of air entering compressor 14 through pipe 22 is far greater than the stoichiometric amount of air necessary for combustion of the fuel arriving through pipe 48, postcombustion can be carried out in chamber 46 using a fraction of the hot gases leaving exchanger 34 as the combustion agent, with the remaining fraction passing through short-circuit pipe 60 in order to adjust the temperature of the hot gas mixture resulting from postcombustion to a level compatible with the temperature required at the inlet of the second expansion turbine 52. The amount of fuel used to effect this postcombustion and arriving through pipe 48 is also adjusted, in combination with the quantity of hot gases circulating in the short-circuit pipe 60, in order to obtain, at the inlet of the second expansion turbine 52, a temperature close to that required in the absence of an exchange effected in exchanger 34, which is for example between 1000 and 1300° C. The hot postcombustion gases thus obtained are expanded in expansion turbine 52, producing a mechanical power close to that obtained in the absence of an exchange in exchanger 34. This mechanical power is used, in the example described, to drive alternator 58.

After expansion, the hot gases are evacuated at a pressure close to atmospheric pressure through pipe 54.

Figure 2:
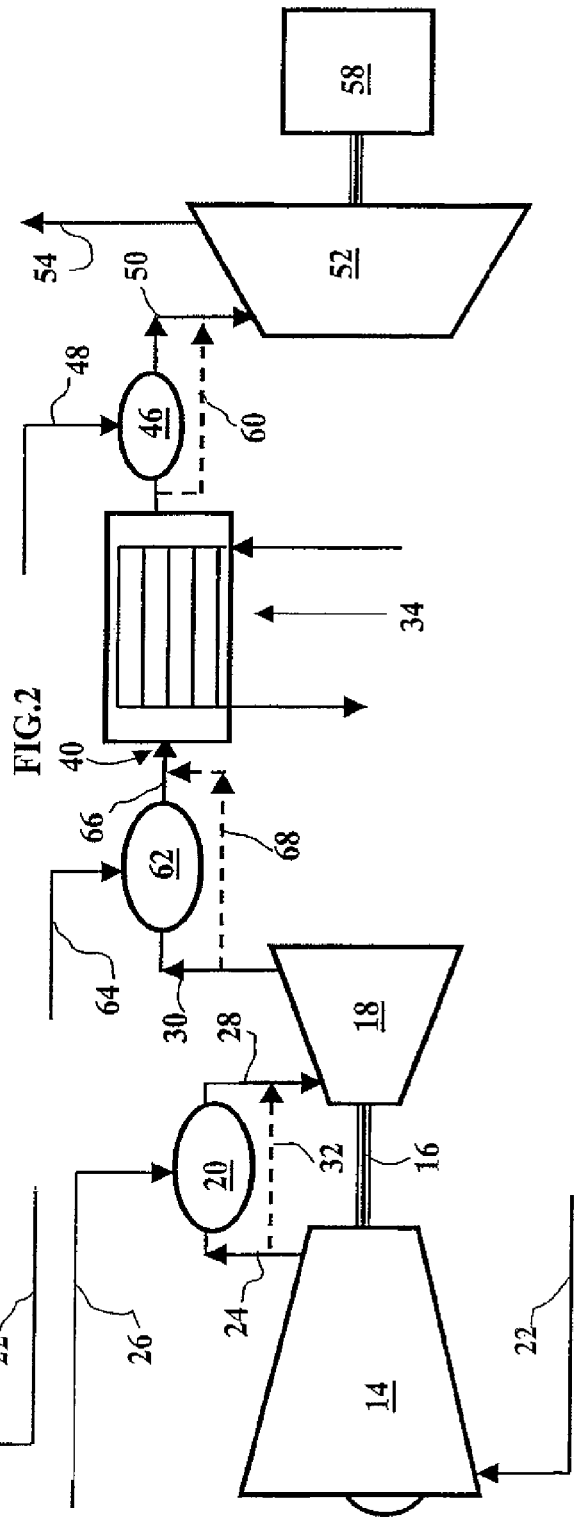
FIG. 2 is a first variant of the device as illustrated in FIG. 1.

FIG. 2 shows an alternative embodiment of FIG. 1 and has the same reference numerals.

In the case of this variant, when it is necessary to provide heat in exchanger 34 at a relatively high temperature, it is also possible to carry out two postcombustion steps.

More specifically, a postcombustion step is carried out prior to the postcombustion effected in postcombustion chamber 46 as described above.

This prior step is carried out in a postcombustion chamber 62 which heats the hot gases leaving the first expansion turbine 18 before they penetrate into exchanger 34. This postcombustion chamber is called upstream postcombustion chamber because it is upstream of the exchange means 34, still in the circulation direction of the hot gases coming from combustion chamber 20.

To carry out this postcombustion, this upstream postcombustion chamber is supplied with fuel such as natural gas by a pipe 63 and with hot gases by pipe 30 connecting expansion turbine 18 to this chamber. The hot gases leaving postcombustion chamber 62 are sent through a pipe 66 to the inlet 40 of the heat exchanger 34. As described in relation to chambers 20 and 46, a short-circuit pipe 68 is provided, the role of which is identical to that of the short-circuit pipes 32 and 60.

Thus, a first postcombustion step is carried out in combustion chamber 62 with combustion of the fuel arriving through pipe 64 and a fraction of the hot gases leaving the expansion turbine 18 through pipe 30, and the remaining fraction of the hot gases passing through short-circuit pipe 68 to effect the temperature adjustment of the hot gases leaving this chamber before they penetrate into exchanger 34. A second postcombustion step is carried out in the postcombustion chamber 46, with the hot gases leaving exchanger 34 and fuel arriving through pipe 48, the quantity of which is adjusted so as to obtain the required temperature at the inlet of the expansion turbine 52.

The layout example shown in FIG. 2 is particularly suited for effecting the heating of an endothermic reaction that occurs at a relatively high temperature such as for example a steam reforming reaction to produce hydrogen from a gas-based feedstock, particularly natural gas.

This enables mechanical or electric power to be generated while providing heat to effect this endothermic reaction. If the carbon dioxide produced in a mixture with hydrogen is separated and sequestered, it is then possible to use at least some of the hydrogen thus produced to effect the combustion and/or postcombustion without giving off carbon dioxide.

Such an endothermic reaction can also be accomplished in association with other feedstocks such as petroleum cuts, alcohols such as methanol, or possibly other feedstocks as well.

Figure 3:
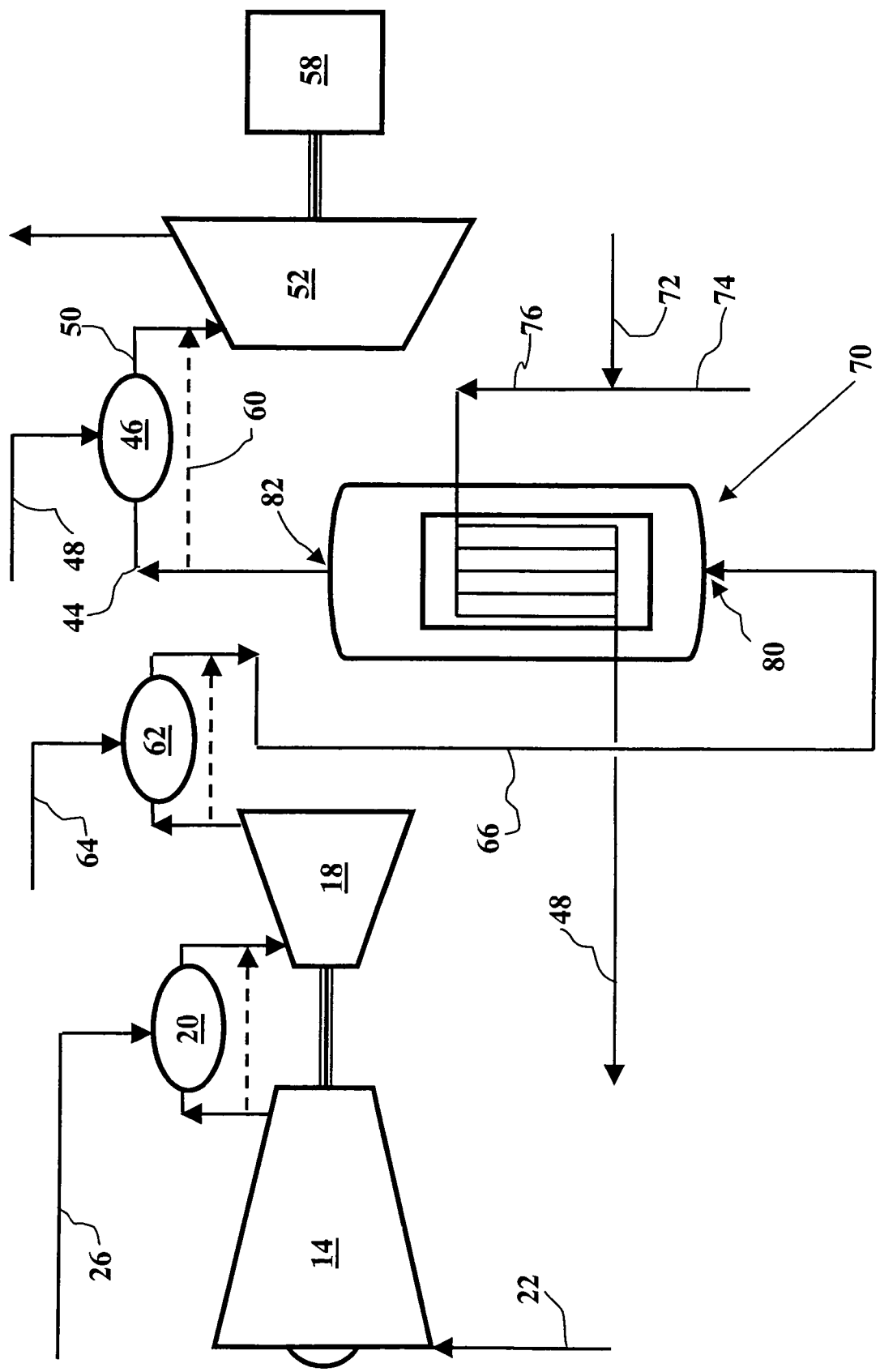
FIG. 3 is a variant of the device in FIG. 2.

Such an application case is illustrated by the facility diagram in FIG. 3 for a steam reforming reaction to produce hydrogen from a gas-based feedstock. This facility has a device which has essentially the same elements as those in FIG. 2 and hence has the same reference numerals.

In this facility, the exchange means is a reactor 70 of the reactor-exchanger type which has a inlet pipe 72 for the gas, preferably natural gas, and an inlet pipe for a fluid 74 such as steam. These two fluids mix where the two pipes join and are sent through a pipe 76 to the reactor inlet. The synthesis gas obtained leaves through a pipe 78 through which it is sent to any known processing device. This reactor also has an inlet 80 for the hot gases coming from upstream postcombustion chamber 62 through pipe 66 and a hot gas discharge 82 to downstream postcombustion chamber 46 through pipe 44.

While this facility is in operation, the natural gas arrives through pipe 72. It has been preheated by heat exchangers not shown. The steam arrives through pipe 74 and is mixed with the natural gas at the join between the two pipes. The molar ratio between the quantity of water introduced by pipe 74 and the quantity of natural gas introduced by pipe 72 is between 2 and 4. The resulting mixture is introduced by pipe 76 into reactor 70. The endothermic reforming reaction, carried out in reactor 70, enables a mixture of carbon CO and hydrogen $H_2$ to be produced. The gas mixing takes place in tubes, in the presence of a catalyst, which can for example be based either on nickel deposited on calcium or magnesium silicoaluminate doped with potash, or nickel on an alumina substrate. The temperature reached at the outlet of the reaction zone is between 850 and 940° C. The reaction is conducted at a pressure of between 20 and 40 bars. Heating of the reactor is provided by the hot gases arriving through pipe 66, at a pressure of for example approximately 4 bars and circulating in the shell counter-currentwise overall. It is possible also to conduct co-current heating to limit the tube wall temperature. The mixture of carbon monoxide and hydrogen obtained is evacuated through pipe 78.

To increase hydrogen production, it is then possible to carry out a second conversion stage in the presence of steam. At the outlet from this second conversion stage, the carbon dioxide can be separated by the various methods known to the individual skilled in the art such as washing with a solvent. The hydrogen produced can then be purified by adsorption or by membranes, separating the unconverted hydrocarbons, which can be recycled to the natural gas inlet.

The hydrogen thus produced can be used at least partially to supply the gas turbine as a fuel in order to generate electricity via the alternator, sharply reducing carbon dioxide emissions.

Instead of using air as the combustion agent in pipe 22, one may also use a mixture of oxygen and recycled carbon dioxide. If the fuel is a hydrocarbon, for example natural gas, exhaust gases with a high carbon dioxide concentration can be obtained so that the carbon dioxide can be easily separated.

The method as described above has the following stages:

(a) a combustion agent including oxygen is compressed in the compression section 14 of a turbine;

(b) a combustion step under pressure is carried out with a mixture of a fuel and a compressed combustion agent;

(c) at least some of the hot gases obtained by combustion under pressure are used to effect an exchange with an external facility 34 or 70;

(d) at least one postcombustion step is carried out, with postcombustion of a mixture of hot gases coming from the exchange, with a fuel, in order to obtain hot gases that are sent to turbine 52, under temperature and pressure conditions close to the conditions prevailing in the absence of step (c).

Thus, the method allows the use of hot gases under pressure generated during the mechanical energy production process while preserving gas turbine performance. Also, it is possible to keep the power generated by the gas turbine substantially constant. Moreover, to minimize the pressure loss between the inlet and outlet of the exchange means, a pressure augmentation device such as a booster can be provided at the outlet of this exchange means.

Figure 4:
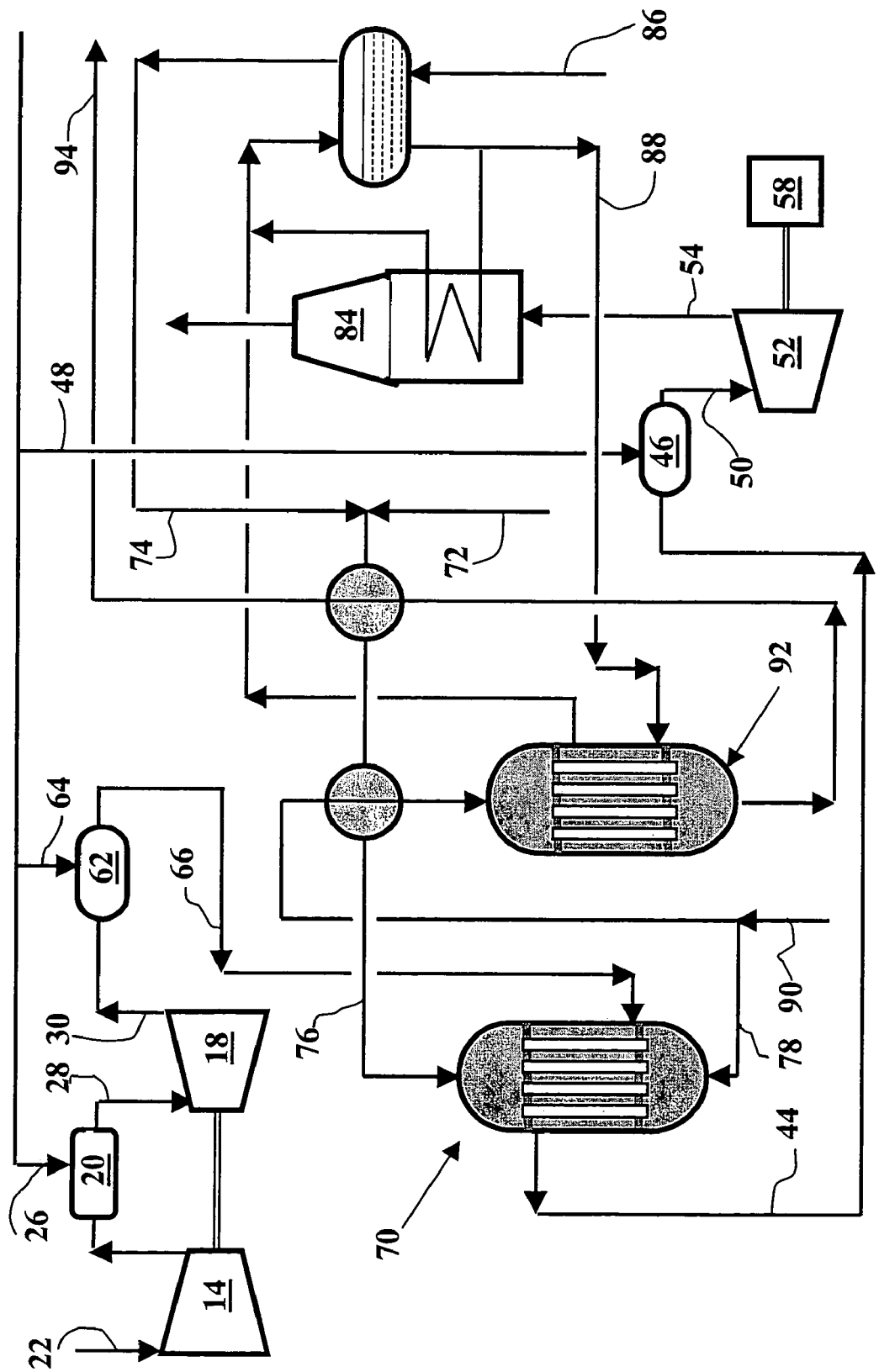
FIG. 4 is a diagram showing the layout of the device according to the invention in a feedstock reforming facility.

This method can be used with a reforming facility illustrated as an example in the diagram of FIG. 4.

In this example, the turbine used is a GE Frame 7 gas turbine, using the terminology of the manufacturer, General Electric. Such a machine can produce a mechanical power of up to 80 MW under iso conditions. Through pipe 2, the axial compressor takes in approximately 958 t/h of ambient air compressed to a pressure of up to approximately 18 bars. The air thus compressed circulating in pipe 24 is mixed, in combustion chamber 20, with approximately 7 t/h of a hydrogen-rich fuel arriving through pipe 26 and the mixture obtained is burned in combustion chamber 20. At the outlet of combustion chamber 20, a mixture of hot gases at a temperature of approximately 1200° C. is obtained. The hot gases are then sent through pipe 28 to the first expansion turbine 18 which the leave via pipe 30 at a pressure of approximately 4 bars and a temperature of approximately 750° C. They are then mixed in the upstream postcombustion chamber 62 with an additional quantity of approximately 4 t/h of hydrogen-rich fuel arriving through pipe 64. Thus, at the outlet of postcombustion chamber 62, a mixture of hot gases at a temperature of approximately 1150° C. is obtained, and these are used, through pipe 66, to heat reactor 70, of the reactor-exchanger type. After exchange, the hot gases leaving reactor-exchanger 70 through pipe 44, are mixed in downstream postcombustion chamber 46 with a third fraction of fuel representing approximately 1 t/h of hydrogen-rich fuel arriving through pipe 48. At the outlet of the downstream postcombustion chamber 46, the hot gases circulating in pipe 50 are once again at a temperature of approximately 750° C. They are then expanded in the second expansion turbine 52 which they leave through pipe 54 at a pressure of approximately 1.3 bars and a temperature of approximately 565° C. The power generated in the expansion turbine is 55 MW.

The hydrogen-rich fuel is produced by reforming approximately 50 t/h of natural gas arriving through pipe 72 in the presence of approximately 170 t/h of steam arriving through pipe 74. This steam is generated in a recovery boiler 84 by recovering heat from the hot gases leaving the second expansion turbine 52 through pipe 54. The steam is generated from demineralized water arriving through a pipe 86 and recirculating in exchange loop 88.

At the outlet of the reactor-exchanger 70, the synthesis gas obtained and circulating in pipe 78 passes through a second conversion step, called "shift conversion" by specialists in the field, during which it reacts in the presence of steam in order to produce an additional quantity of hydrogen, while converting some of the CO produced into carbon dioxide. For this purpose, a flow of 56 t/h of water is made to arrive through a pipe 90 and is consumed by the shift conversion reaction in a reactor 92. This shift conversion reaction must be carried out at a temperature lower than that required to produce the main reforming reaction. The temperature is held at approximately 400° C., generating 46 t/h of steam.

The vapor generated in the recovery loop 88 represents 164 t/h, 124 t/h of which is used for producing synthesis gas. The flow of 40 t/h not used for generating synthesis gas can be either exported or used in a condensation cycle.

The synthesis gas leaving reactor 92 through pipe 94 is then sent to a hydrogen washing and purification section (not shown).

Thus, 25 t/h of pure hydrogen is produced, some of which can be used directly to supply the gas turbine and the postcombustion steps. Another fraction can undergo further purification in a unit such as a PSA type adsorption purification unit.

Figure 5:
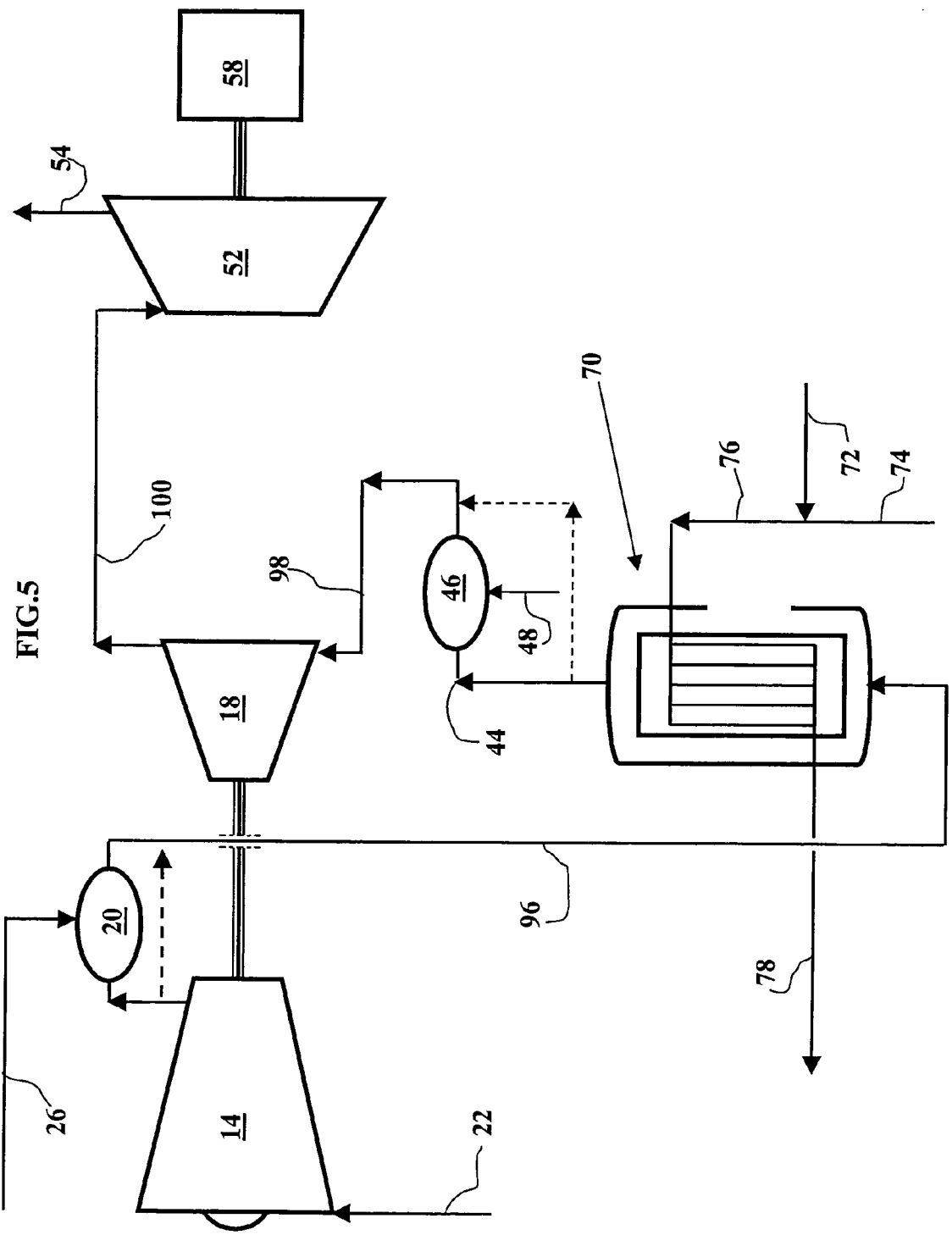
FIG. 5 is another variant configuration of the device according to FIG. 1.

Reference will now be made to FIG. 5 which is a variant of FIG. 3 and in which the hot gases resulting from combustion in combustion chamber 20 are evacuated through pipe 96 directly to the inlet 80 of reactor 70, at a pressure which can for example be between 10 and 40 bars. In this case it may be advantageous to carry out the reaction in reactor 70 at an at least slightly higher pressure to prevent any risk of oxygen-containing gas passing into the reagents. The hot gases leaving reactor 70 through pipe 44 are then sent to a downstream postcombustion chamber 46. The quantity of fuel brought by pipe 48 is adjusted to obtain, at the inlet of the first expansion turbine 18, hot gases which are carried by a pipe 98 connecting the downstream postcombustion chamber and the first expansion turbine 18, at the temperature required to obtain a mechanical power close to the maximum power deliverable by the turbine. The hot gases leaving this expansion turbine 18 are then sent through a pipe 100 to the second expansion turbine 52 driving alternator 58.

Figure 6:
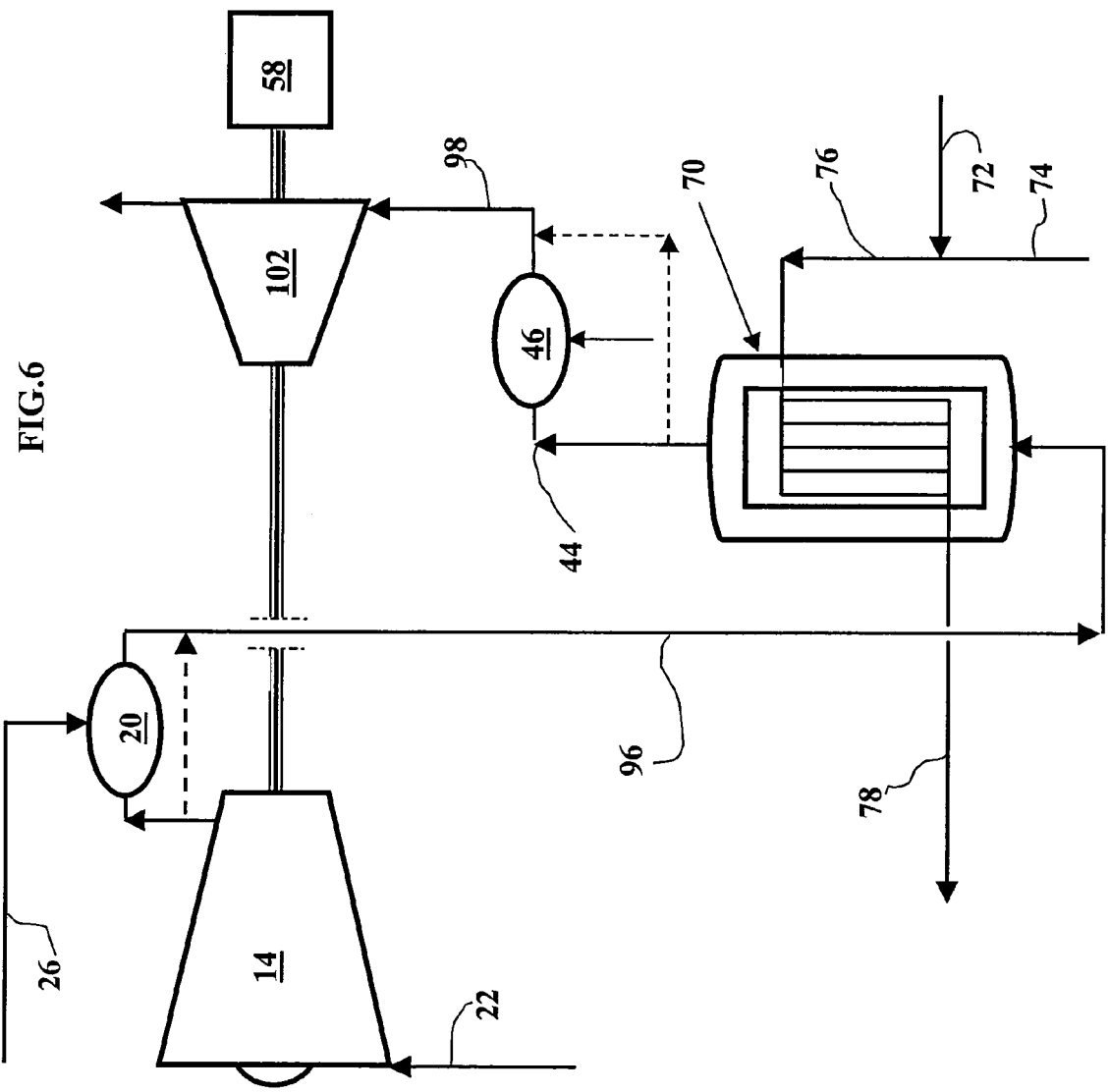
FIG. 6 is another variant configuration of the device according to the invention.

The configuration example shown in the above figures also applies to the case of a single-shaft turbine as illustrated schematically in FIG. 6.

In this case, a single turbine 102 is connected by the same shaft 16 to both compressor 14 and to alternator 58.

In this variant using, for example, the configuration of FIG. 5, the hot gases leaving the downstream combustion chamber 46 are sent through pipe 98 to the expansion turbine 102, which drives not only the compressor 14 but also the alternator 58.

It is also possible to apply the principle of the method according to the invention to the case where not only is heat exchanged in the exchange means but also material is exchanged between the two gas streams circulating in the exchange means, such as a reactor-exchanger.

A first possible application case relates to oxygen transfer. In such a case, the reactor-exchanger can be created by using tubes made of a ceramic material, selectively permeable to oxygen. For this purpose, use may be made in particular of perovskyte type ceramics in which oxygen ions can be transferred. Such an arrangement can be advantageous for producing synthesis gas from relatively heavy hydrocarbon feedstocks, or to obtain a mixture of CO and hydrogen containing the proper proportion of CO, for example to feed a Fischer-Tropsch synthesis reaction.

A second possible case relates to hydrogen transfer. In this case, the reactor-exchanger can be made by using selectively hydrogen-permeable tubes, for example tubes with a selective palladium layer.

This favors the progress of the reaction and an increase in the hydrogen conversion rate.

The hydrogen can thus be directly separated and mixed with the combustion agent to effect the postcombustion step.

The invention claimed is:

1. A turbine cogeneration method, by a turbine comprising a compression section, at least first and second expansion sections, and a combustion chamber, wherein the following steps are carried out:
    (a) a combustion agent including oxygen is compressed in the compression section;
    (b) in the combustion chamber, a combustion step is carried out under pressure with a mixture of combustion agent compressed with a fuel;
    (c) at least some of the hot gas obtained by pressurized combustion is introduced in a first expansion section,
    (d) one postcombustion step comprising combustion in a first postcombustor immediately downstream, with respect to the flow of gases, of the first expansion section is carried out of a mixture of gas coming from the first expansion section with a fuel, prior to an exchange,
    (e) at least some of the hot gas obtained by the one postcombustion step is used to effect an heat exchanger provided immediately downstream, with respect to the flow of gases, of the first postcombustor with an external facility,
    (f) at least one other postcombustion step comprising combustion in a second postcombustor is carried out of a mixture of the hot gas coming from the exchange, with a fuel, in order to obtain hot gas, and
    (g) the hot gas from the at least one other postcombustion step is sent to a second expansion section.

2. The turbine cogeneration method according to claim 1, characterized in that the at least one other postcombustion step is carried out by introducing a quantity of fuel which is adjusted to obtain a hot gas temperature at the inlet of the expansion section that is substantially close to the initial inlet temperature in the absence of an exchange.

3. The turbine cogeneration method according to claim 1, characterized in that the at least one other postcombustion step is carried out by introducing a quantity of hot gases, which is adjusted to obtain a hot gas temperature at the inlet of the expansion section that is substantially close to the initial inlet temperature in the absence of an exchange.

4. The turbine cogeneration method according to claim 1, characterized in that a steam production operation is carried out by exchange with the external heat exchanger.

5. The turbine cogeneration method according to claim 1, characterized in that a feedstock reforming operation is conducted by exchange with the external heat exchanger.

6. A turbine cogeneration device, comprising a compression section in which a combustion agent including oxygen is compressed, a combustion chamber in which a combustion step is carried out under pressure with a mixture of combustion agent compressed with a fuel, a first expansion section in which at least some of the hot gas obtained from the combustion chamber is introduced, a first postcombustion chamber in which a postcombustion step is carried out of a mixture of gas coming from the first expansion section with a fuel, the first postcombustion chamber being provided immediately downstream, with respect to the flow of gases, of the first expansion section, and a heat exchanger provided immediately downstream, with respect to the flow of gas, of the first postcombustion chamber, for exchanging heat between the hot gases coming from the first postcombustion chamber and a fluid to be heated, at least one other postcombustion chamber in which another postcombustion step is carried out of a mixture of the hot gas coming from the heat exchanger with a fuel, and a second expansion section in which hot gas coming from the at least one other postcombustion chamber is expanded.

7. The cogeneration device according to claim 6, characterized in that the cogeneration device includes a short-circuit pipe for adjusting the hot gas temperature at the outlet of the combustion chamber and/or of the postcombustion chamber.

8. The cogeneration device according to claim 6, characterized in that the heat exchanger includes a reactor.

9. The cogeneration device according to, claim 6, characterized in that the cogeneration device includes a hot gas pipe connecting the first expansion section to the second expansion section.

* * * * *